United States Patent
Farris et al.

[11] Patent Number: 5,472,677
[45] Date of Patent: Dec. 5, 1995

[54] METHOD FOR DECOMPOSING N20 UTILIZING CATALYSTS COMPRISING CALCINED ANIONIC CLAY MINERALS

[75] Inventors: Thomas S. Farris, Bethlehem; Yuejin Li, Wescosville; John N. Armor, Orefield; Thomas A. Braymer, Allentown, all of Pa.

[73] Assignee: Engelhard Corporation, Iselin, N.J.

[21] Appl. No.: 394,129

[22] Filed: Feb. 4, 1995

Related U.S. Application Data

[63] Continuation-in-part of Ser. No. 113,023, Aug. 27, 1993, Pat. No. 5,407,652.

[51] Int. Cl.$^6$ ................................................. C01B 21/04
[52] U.S. Cl. ........................................... 423/239.1; 502/80
[58] Field of Search ............................... 423/235, 239.1, 423/239.2; 502/80, 84

[56] References Cited

U.S. PATENT DOCUMENTS

| | | | |
|---|---|---|---|
| 4,140,654 | 2/1979 | Yoshioka et al. | 252/440 |
| 5,039,645 | 8/1991 | Elliott et al. | 502/217 |
| 5,171,533 | 12/1992 | Li | 423/239 |

FOREIGN PATENT DOCUMENTS

| | | |
|---|---|---|
| 0330224 | 8/1989 | European Pat. Off. . |
| 3543640A1 | 6/1987 | Germany . |
| 4128629A1 | 3/1993 | Germany . |
| WO91/10505 | 7/1991 | WIPO . |
| WO94/27709 | 12/1994 | WIPO . |

OTHER PUBLICATIONS

"Nylon Production: An Unknown Source of Atmospheric Nitrous Oxide"; Thiemens et al.; (Science) vol. 251 pp. 932–934 1991 (no month).
"Structure and Catalytic Activity of Iron Oxide and Magnesium Oxide Solid Solutions" Schiarvello et al.; (J. Chem. Soc. Faraday Trans.); 1, 71(8); (no date).
"Structure and Catalytic Activity of $Co_xAl_2O_4$ Spinel Solutions"; Angeletti et al.; (J. Chem. Soc. Faraday Trans.); 1, 74(7); (no date).
"Catalytic Reactions by Thermally Activated, Synthetic, Anionic Clay Materials" Reichle; (Journal of Catalysis) 94; 1985 pp. 547–557 (odd pages only) (no month).

*Primary Examiner*—Gary P. Straub
*Assistant Examiner*—Thomas G. Dunn, Jr.

[57] ABSTRACT

The invention describes a highly efficient catalytic pollution control process for removing $N_2O$ from gaseous mixtures. The process utilizes catalysts derived from anionic clay minerals, which after appropriate heat activation, provide superior $N_2O$ decomposition activity. The catalytic process comprises contacting an $N_2O$-containing gaseous mixture with the decomposition catalyst under conditions sufficient to convert the $N_2O$ into gaseous nitrogen and gaseous oxygen. The process catalysts are derived from anionic clay materials such as the hydrotalcites, sjogrenites and pyroaurites. A small but critical amount of an activator metal is provided to promote the decomposition of $N_2O$, particularly in wet gas steams. The activator metal may be an alkali metal such as sodium, potassium or lithium, or an alkaline-earth metal such as magnesium, with sodium giving particularly good results.

21 Claims, 6 Drawing Sheets

METHOD FOR DECOMPOSING N20 UTILIZING CATALYSTS COMPRISING CALCINED ANIONIC CLAY MINERALS

RELATED APPLICATIONS

The present application is a continuation-in-part of U.S. Ser. No. 08/113,023, filed Aug. 27, 1993, now U.S. Pat. No. 5,407,652.

TECHNICAL FIELD OF THE INVENTION

The present invention describes a highly efficient pollution control process for catalytically converting nitrous oxide ($N_2O$) into nitrogen gas and oxygen gas which utilizes decomposition catalysts derived from anionic clay minerals, which after appropriate heat activation, provide superior $N_2O$ decomposition activity.

BACKGROUND OF THE INVENTION

Nitrous oxide ($N_2O$) is not commonly considered an atmospheric pollutant and has not been considered a constituent of the gaseous pollutants collectively referred to as nitrogen oxides ($NO_x$) which have received wide attention as pollutants harmful to the environment. However, recent studies indicate that $N_2O$ in the Earth's atmosphere may be increasing by about 0.2% per year and that this increase appears to be caused by anthropogenic activity.

$N_2O$ is a major stratospheric source of NO, is believed to be involved in destroying the ozone layer and is recognized to be a green-house gas. Because $N_2O$ has an atmospheric lifetime of approximately 150 years, researchers are attempting to identify sources of the pollutant and to limit further production of the harmful gas. Recent reports such as an article by Thiemens and Trogler, *Science*, 251 (1991) 932 suggest that various industrial processes significantly contribute to the increased levels of $N_2O$ found in the Earth's atmosphere.

For example, nitrous oxide is a by-product in the manufacture of monomers for producing 6,6- and 6,12-nylon. Approximately $1.24 \times 10^9$ kg of nylon were produced in the United States in 1988, alone. Nylon polymers are typically formed by subjecting a dicarboxylic acid and a diamine to a condensation polymerization reaction. The most widely used dicarboxylic acid, adipic acid, is prepared primarily by oxidizing cyclohexane in air to form a cyclohexanol/cyclohexanone mixture followed by oxidizing such mixture with $HNO_3$ to form adipic acid and $N_2O$. Thiemens and Trogler calculate that about 1 tool of $N_2O$ per mole of adipic acid is formed as a side product in adipic acid processes. Assuming that $2.2 \times 10^9$ kg of adipic acid are produced globally per year, about $1.5 \times 10^{10}$ mol yr$^{-1}$ of $N_2O$ by-product or 10% of the annual output of atmospheric $N_2O$ can be attributed to this single process.

M. Schiavello and coworkers (*J. Chem Soc. Faraday Trans.* 1, 71(8), 1642–8) studied various magnesium oxide-iron oxide and magnesium oxide-iron oxide-lithium oxide systems as $N_2O$ decomposition catalysts. While magnesium oxide-iron oxide samples which were fired in air and which contained $MgFe_2O_4$ demonstrated low activity, similar samples fired under reducing atmospheres and containing $Fe^{2+}$ in solid solution demonstrated greater activity. The researchers calculated that $Fe^{3+}$ ions in the ferrite phase are not catalytically active toward the subject reaction whereas $Fe^{3+}$ ions contained in MgO together with $Li^+$ are catalytically active when the ratio of lithium to iron is less than 1.

P. Porta and coworkers (*J. Chem. Soc. Faraday Trans.* 1, 74(7), 1595–603) studied the structure and catalytic activity of $Co_xMg_{1-x}Al_2O_4$ spinel solid solution for use as catalysts in decomposing $N_2O$ into gaseous nitrogen and oxygen. The catalytic activity per cobalt ion in various $N_2O$ decomposition catalysts was found to increase with increasing dilution in MgO. The distribution of cobalt ion among octahedral and tetrahedral sites in the spinel structure of $Co_xMg_{1-x}Al_2O_4$ was found to vary with temperature and the fraction of cobalt ions in octahedral sites was found to increase with increasing quenching temperature. The researchers concluded that catalytic activity generally increases as a greater amount of cobalt ions are incorporated into octahedral sites in the structure.

W. Reichle (*Journal of Catalysis* 94 (1985) 547) reported that various anionic clay minerals belonging to the pyroaurite-sjogrenite group, such as hydrotalcite $(Mg_6Al_2(OH)_{16}(CO_3^{2-})\cdot 4H_2O$ can be thermally decomposed to form a product which is a useful catalyst for vapor-phase aldol condensations. Replacement of Mg by Fe, Co, Ni and Zn and/or replacement of Al by Fe and Cr also results in isomorphous double hydroxides which, on heat treatment, are rendered catalytically active. The reference also states that the activity of the catalyst is strongly affected by the temperature at which the hydrotalcite is activated.

U.S. Pat. No. 5,171,553, discloses a highly efficient, commercially viable process for removing $N_2O$ from gaseous mixtures. The process utilizes catalysts comprising a crystalline zeolite which, at least in part, is composed of five membered rings having a structure type selected from the group consisting of BETA, MOR, MFI, MEL and FER wherein the crystalline zeolite has been at least partially ion-exchanged with a metal selected from the group consisting of copper, cobalt, rhodium, iridium, ruthenium and palladium.

Industry urgently desires to develop catalytic processes for destroying $N_2O$ emissions prior to venting commercial process effluent streams into the atmosphere. Although catalytic decomposition of $N_2O$ has been studied extensively in academic institutions, few commercially viable processes are known for decomposing $N_2O$ into its respective components, namely gaseous nitrogen and gaseous oxygen, which utilizes a catalyst which exhibits the activity and life provided by the catalysts of the present invention.

U.S. Ser. No. 08/113,023 (the "'023 application"), filed Aug. 27, 1993, of which the present application is a continuation-in-part, teaches the use of various catalysts derived from anionic clay materials for decomposing $N_2O$ in exhaust gas streams. The present invention is directed to certain improvements on the processes and catalysts taught by that application.

The '023 application is directed to a catalytic process for removing $N_2O$ from exhaust streams utilizing a catalyst formed from one or more anionic clay minerals, which after appropriate heat activation, provide superior $N_2O$ decomposition activity. The process comprises reacting an $N_2O$-containing stream in the presence of an effective amount of one or more of the enumerated catalysts under conditions sufficient to convert the $N_2O$ to gaseous nitrogen and oxygen. Experimental results presented in Tables 1, 2 and 3 of the '023 application, which are the same as Tables 1, 2 and 3 of the present application, generally show excellent conversion of $N_2O$ when applied to gas streams containing just $N_2O$ and helium (see footnote a of each table). However, in test streams additionally containing 2% water (see footnote c of each table, and all test results marked with a "c") some of the catalysts provided poor $N_2O$ decomposition (see Runs 3–7, 11, 13 and 18) while others still provided excellent results (see Runs 10 and 17). From these test results, it was seen that some factor in the catalysts which was affecting their ability to catalyze $N_2O$ decomposition in water-containing gas streams. It is therefore desired to provide catalysts which are suitable for catalyzing $N_2O$-containing gas streams, regardless of whether or not such streams also contain water.

BRIEF SUMMARY OF THE INVENTION

In accordance with the present invention, applicants have found that good results are obtained in catalyzing $N_2O$ decomposition in gas streams which may contain water when the catalysts of the '023 application are provided with a relatively small but critical amount of one or more alkali metals, such as sodium, lithium or potassium, or alkaline-earth metals, such as magnesium. Applicants have chosen to designate such metals as "activator metals", since they appear to provide added activation to the catalysts of the '023 application. As shown by the test results presented below, the presence of such activator metals can greatly improve the ability of such catalysts to decompose $N_2O$ in gas streams containing water. Such catalysts are also suitable for catalyzing water-free $N_2O$-containing gas steams as well.

The catalysts described in Examples 1 to 5 of the '023 application, which are the same as Examples 1 to 5 of the present application, are all made by a process which leaves a substantial amount of residual sodium in the catalysts. Although these examples all indicate that "excess sodium" was removed by washing with large amounts of distilled water, it is believed that different runs contained different amounts of sodium after washing. Applicants believe that variations in the levels of residual sodium remaining in these catalysts after washing may account for the variations in the effectiveness of these catalysts to promote decomposition of $N_2O$ in test streams containing water, as discussed above.

The present applicants found that if the catalysts of the '023 application were washed vigorously enough to remove substantially all of the sodium, that is, to the point where the residual sodium is less than 0.5 weight percent, then the catalysts became less active in $N_2O$ gas streams containing water. Therefore, in accordance with one embodiment of the present invention, the activator metal is "provided" by allowing a sufficient amount of residual activator metal to remain on the catalyst. That is, the process of "washing" the catalyst is controlled to ensure that a sufficient amount of residual activator metal remains on the catalyst.

In accordance with another embodiment of the present invention, the activator metal is "provided" to a catalyst which has been rendered substantially free of such metals by instilling an activator metal into the catalyst.

Applicants have found that when the catalysts of the '023 application contain at least about 1 weight percent of an activator metal, that superior catalytic activity is obtained. In accordance with standard rules of rounding off to one significant digit, applicants intend the scope of "about 1 percent" to encompass values as low as 0.5 percent. Preferably, less than about 10 weight percent activator metal is provided, more preferably less than about 6 weight percent. Particularly good results are obtained when the catalyst contains about 3 to about 6 percent residual activator metal. Alternatively, if the catalyst is washed to remove substantially all residual activator metal, then good results are obtained when about 1 to about 2 percent activator metal is re-instilled into the catalyst. A preferred activator metal is sodium, either alone or in combination with other activator metals.

As discussed above, the catalysts of the present invention are particularly suitable for treating $N_2O$-containing gas streams which also contain water, particularly streams containing at least about 0.5 percent water, and more particularly those containing at least about 2 percent water.

The catalysts according to the '023 application are formed by heat treating one or more anionic clay materials represented by the generic formula:

$M_mN_n(OH)_{(2m+2n)}A_a \cdot bHO$ wherein

M is a divalent metal cation;

N is a trivalent metal cation;

A is a mono-, di- or trivalent anion which decomposes when heated to a temperature sufficient to form a volatile gas;

m and n are such that m/n has values of 0.5 to about 6;

a is a number with the provisos that when A is a monovalent anion, a=n, when A is a divalent anion, a=½ n and when A is a trivalent anion, a=⅓ n and b is an integer having values of 1 to 10.

The process of utilizes a family of catalysts which had not been utilized for the subject $N_2O$ decomposition process. Furthermore, the process utilizes catalysts which provide superior conversion of $N_2O$ to gaseous oxygen and nitrogen and extended catalyst life.

DETAILED DESCRIPTION OF THE INVENTION

The present invention relates to a highly efficient catalytic process for converting nitrous oxide ($N_2O$) into environmentally safe products, namely gaseous oxygen and gaseous nitrogen. The claimed process utilizes catalysts derived from one or anionic clay minerals, which after appropriate heat activation, provide superior catalytic activity and life under typical process conditions. Moreover, the process can be operated at lower temperatures than processes using other catalysts and the catalysts used in the process exhibit extended catalyst life.

The catalysts of the present invention are obtained by providing the catalysts of the '023 application with a relatively small but critical amount of one or more activator metals selected from the group consisting of sodium, lithium, potassium or magnesium. Applicants have chosen to designate such metals as "activator metals", since they appear to provide added activation to the catalysts of the '023 application. As shown by the test results presented below, the presence of such an activator metal can greatly improve the ability of such catalysts to decompose $N_2O$ when the gas streams containing $N_2O$ also contain water.

As discussed above, the catalysts described in Examples 1 to 5 of the '023 application, which are the same as Examples 1 to 5 of the present application, are all made by a process which leaves a substantial amount of residual sodium in the catalysts. Although these examples all indicate that "excess sodium" was removed by washing with large amounts of distilled water, it is believed that different runs contained different amounts of sodium after washing. Applicants believe that variations in the levels of residual sodium remaining in these catalysts after washing may account for the variations in the effectiveness of these catalysts to promote decomposition of $N_2O$ in test streams containing water, as discussed above. The present applicants found that if the catalysts of the '023 application were washed vigorously enough to remove substantially all of the sodium, that is, to the point where the residual sodium is less than 0.5 weight percent, then the catalysts became less active in $N_2O$ gas streams containing water.

In accordance with one embodiment of the present invention, the activator metal is "provided" by allowing a sufficient amount of residual activator metal to remain on the catalyst. That is, the process of "washing" the catalyst is controlled to ensure that a sufficient amount of residual activator metal remains on the catalyst. In accordance with another embodiment of the present invention, the activator metal is "provided" to a catalyst which has been rendered substantially free of such metals by instilling an activator metal into the catalyst.

Applicants have found that when the catalysts of the '023 application contain at least about 1 percent of an activator metal, that superior catalytic activity is obtained in decomposing $N_2O$ in gas streams which also contain water. Preferably, the amount of activator metal provided is less than about 10 weight percent, because it was found that higher levels can have a deleterious effect on the catalysis of $N_2O$ decomposition, and more preferably the amount is less than about 6 percent. Particularly good results are obtained when the catalyst contains about 3 to about 6 percent residual activator metal. Alternatively, if the catalyst is washed to remove substantially all residual activator metal, then good results are obtained when about 1 to about 2 percent activator metal is re-instilled into the catalyst. A preferred activator metal is sodium, either alone or in combination with other activator metals.

The catalysts according to the present invention are prepared by providing a minimum of about 1 percent by weight of an activator metal to a catalyst precursor which is then formed into catalyst by heat treating or calcining, wherein the catalyst precursor comprises one or more anionic clay materials represented by the formula:

wherein

M is a divalent metal cation;

N is a trivalent metal cation;

A is a mono-, di- or trivalent anion which decomposes when heated to a temperature sufficient to form a volatile gas;

m and n are such that m/n has values of 0.5 to about 6;

a is a number with the provisos that when A is a monovalent anion, a=n, when A is a divalent anion, a=½ n and when A is a trivalent anion a=⅓ n; and b is an integer having values of 1 to 10.

The resulting heat treated anionic clay materials possess a composition and morphology which is highly active toward decomposing $N_2O$ into its corresponding decomposition products, gaseous oxygen and nitrogen. The anionic clay materials recited in the above-mentioned formula include, but are not limited to materials commonly referred to as hydrotalcites, sjogrenites and pyroaurites which compositions are well defined and can be prepared according to methods known in the art. The temperature required to decompose the mono-, di- or trivalent anion, A, to form a volatile gas will vary depending upon the particular anionic clay material and such temperatures can be readily determined by one of ordinary skill in the art without undue experimentation. Typical decomposition temperatures range from about 200° to 800° C.

The anionic clay minerals from which the process catalysts are derived can be prepared synthetically utilizing a variety of anions. Moreover, the $M^{+2}/N^+$ ratio can be varied widely to achieve the desired catalyst activity. The anionic clays minerals of the present invention are converted to an active catalytic material by heating the anionic clay materials to a temperature sufficient to form a catalyst which exhibits $N_2O$ decomposition activity. Suitable heat treatment temperatures vary depending upon the particular anionic clays materials and usually range from about 200° C. to about 800° C. at which temperatures the anionic moieties are decomposed to gaseous compounds. The heat treatment can be conducted in air, inert gases, vacuum or in an $N_2O$-containing gaseous mixture. The preferred ratio of m to n according to the formula of the general embodiment can be varied from 1 to 4 according to conventional techniques known in the art. M can be any divalent cation which provides $N_2O$ decomposition activity upon heat treating the anionic clay materials. Suitable divalent cations include $Co^{2+}$, $Cu^{2+}$, $Ni^{2+}$, $Pd^{2+}$, $Zn^{2+}$, $Fe^{2+}$, $Mn^{2+}$, $Mg^{2+}$ and mixtures thereof. Suitable trivalent cations include $Al^{3+}$, $Ga^{3+}$, $In^{3+}$, $Fe^{3+}$, $Rh^{3+}$, $Co^{3+}$, $B^{3+}$, $Cr^{3+}$, $La^{3+}$, $Sc^{3+}$, $Y^{3+}$ and the rare earth metals including $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$ and mixtures thereof. According to a preferred embodiment, the process utilizes catalysts formed by heat treating one or more anionic clay materials represented by the formula:

wherein

M is $Co^{2+}$, $Cu^{2+}$, $Ni^{2+}$, $Pd^{2+}$, $Zn^{2+}$, $Fe^{2+}$, $Mn^{2+}$, $Mg^{2+}$ or mixtures thereof;

A is a mono-, di- or trivalent anion which decomposes when heated to a temperature sufficient to from a volatile gas;

m and n are such that m/n has values of 0.5 to about 6;

a is a number with the provisos that when A is a monovalent anion, a=n, when A is a divalent anion, a =½ n and when A is a trivalent anion a=⅓ n; and b is an integer having values of 1 to 10.

Throughout the Specification and Claims, Applicants shall use the abbreviation, HT, for hydrotalcite. Since each trivalent cation has one more positive charge than the divalent cation, the sheets gain one unit of positive charge per each trivalent ion which charge is compensated by suitable anions such as $CO_3^{2-}$ which are located interstitially. Water molecules may be situated between each metal ion sheet. The preferred ratio of M to Al according to the formula of the preferred embodiment can be varied from 1.5 to 4 according to conventional techniques known in the art.

While Mg-Al-HT is essentially inactive toward catalytic decomposition of $N_2O$, superior catalytic activity is obtained by utilizing the claimed catalytic compositions wherein the enumerated divalent and trivalent cations are incorporated into the anionic clay materials. Suitable divalent cations include $Co^{2+}$, $Cu^{2+}$, $Ni^{2+}$, $Pd^{2+}$, $Zn^{2+}$, $Fe^{2+}$, $Mn^{2+}$, $Mg^{2+}$ and mixture trivalent cations include $Al^{3+}$, $Ga^{3+}$, $In^{3+}$, $Fe^{3+}$, $Rh^{3+}$, $Co^{3+}$, $B^{3+}$, $Cr^{3+}$, $La^{3+}$, $Eu^{3+}$, $Sc^{3+}$, $Y^{3+}$ and the rare earth metals including $Ce^{3+}$, $Nd^{3+}$, $Pm^{3+}$, $Sm^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$ and mixtures Preferred divalent cations include $Co^{2+}$, $Ni^{2+}$, $Cu^{2+}$, $Pd^{2+}$, $Zn^+$ and $Fe^{2+}$ and preferred trivalent cations include $Al^{3+}$, $Ga^{3+}$, $Fe^{3+}$, $Rh^{3+}$, $Co^{3+}$ and $La^{3+}$. Such divalent or trivalent cations can be incorporated into the anionic clay materials by the methods described herein to form particularly active catalysts.

As shall be explained in greater detail, a portion of the divalent ion enumerated in the formulae of the general and preferred embodiments, such as $Mg^{2+}$ in Mg—Al—HT, can be completely or partially replaced by other divalent cations such as copper, cobalt, zinc, iron, nickel or palladium. Optionally, a portion of the aluminum atoms can be replaced by other trivalent atoms such as Cr, Ga, La, Rh or Fe to yield active catalysts for $N_2O$ decomposition.

The active catalysts of the present invention are derived from layered mixed metal hydroxides having a divalent ion which is partially substituted by trivalent ions whose excess positive charge is compensated by anions occupying the interlayer positions. Techniques capable of substituting the above-enumerated metals for the magnesium or aluminum atoms of the hydrotalcite are available in the public domain. For example, suitable methods include the synthetic techniques described by S. Miyata and coworkers *Nippon Kagaku Zasshi* 92, 514 (1971)); ion exchange techniques described by S. Miyata and coworkers, *Clays Clay Miner.* 31,305 (1983) and techniques involving neutralization of the respective carbonates described by D. L. Bish, *Bull. Mineral* 103 (1980) 170.

For example, Reichle (*Solid States Ionics* 22 (1986) 135) teaches several methods for preparing anionic clay minerals suitable for practicing the enumerated process. A general method for preparing such materials involves mixing a concentrated aqueous solution of the desired cationic metal sources (represented by $M^{2+}$ and $M^{3+}$ in the formula of the general and preferred embodiments) with an aqueous hydroxide/carbonate solution to yield an amorphous gel which is thermally aged at a temperature between 60° to 325° C. to provide an active catalyst for processes other than $N_2O$ decomposition.

Alternately, the anionic clay materials of the present invention can be prepared by conventional methods proposed by Reichle and coworkers (*J. Catal.*, 94 (1985) 547) wherein desired metal nitrates are sequentially precipitated using a $NaOH/Na_2CO_3$ mixture. The resultant precipitate is aged at 65° C. for 24 hours and is filtered, washed with distilled water and dried overnight at 70° C. to provide the desired anionic clay powder.

An alternate method for preparing the enumerated anionic clay materials, in general, and HT, in particular, comprises adding a solution of mixed magnesium/aluminum nitrates, sulfates or chlorides to a stoichiometric solution of sodium hydroxide and sodium carbonate at about 25° to 35° C., while stirring vigorously over a period of several hours to form a slurry. The slurry is heated to about 50° to 200° C. for 1 to 18 hours (preferably 60°–75° C.) in order to promot crystallization. A practical mixing temperature ranges from about 65°–75° C. which yields a crystal of about 150–300 Å in size having a surface area of 100–120 $m^2/g$ ($BET/N_2$ technique). The resulting solids are recovered by filtering followed by washing and drying.

The rate at which the metal ions are added to the aqueous caustic/carbonate solution is not critical to preparing the materials nor is the reaction temperature. The rate of addition can also be varied widely. However, the solutions must be effectively agitated in order to preclude undesired reactions from taking place. The addition temperature is normally maintained at or about room temperature. The resulting gel material is aged at elevated temperatures, normally less than 100° C., to form hydrotalcite crystallite.

Applicants have discovered that the anionic clay materials should not be washed excessively prior to heat treatment because such excessive washing results in diminished catalyst activity. Applicants believe that excessive washing of the anionic clay precursor removes alkali metal or alkaline earth metal from the material. Applicants have further discovered that materials having diminished alkali metal or alkaline earth metal content due to excessive washing can be modified by adding small amounts of the depleted alkali metal salts or alkaline earth metal salts to the material prior to calcination to provide a catalyst which exhibits enhanced activity toward $N_2O$ decomposition. For example, sodium salts, potassium salts, lithium salts and magnesium salts can be used for this purpose.

The resulting materials represented by the formulae of the general and preferred embodiments are heat treated at a temperature between about 150° and 800°, preferably between 300° and 500° C., in air, an inert gas stream, in vacuo or in situ in the presence of the $N_2O$-containing stream to be decomposed to provide a catalyst which possesses a well defined X-ray powder pattern. The heat treatment temperature used to convert the anionic clay material to the active catalyst can be varied widely. At temperatures less than about 200° C., the desired mixed metal oxides are formed slowly and incompletely. The heat treatment temperature should be selected to provide to control the extent to which the anionic clay material is converted to active catalyst while maintaining acceptable surface area.

Preferred temperatures for heat treating a given anionic clay material according to the present invention can be readily determined without undue experimentation. Non-stoichiometric, well dispersed mixed metal oxides are formed upon heat treating the enumerated anionic clay materials within the specified temperature ranges. The heat treatment causes the mono-, di- and trivalent anions represented by "A" in the formula of the general and preferred embodiments to decompose to a volatile gas thereby forming the active catalyst.

The fine catalyst powders obtained according to these methods can be supported on conventional inorganic supports such as clays, alumina, silica, silica/alumina, titania, zeolites or cordierite. The powders can be formed into pellets or extruded to form particles which are wear and impact resistant and can function effectively in fixed-bed reactors. Conventional binders and other additives can be added to the catalyst to aid in the forming process.

The process for destroying nitrous oxide comprises contacting a gaseous mixture containing nitrous oxide with a desired catalyst according to the present invention under conditions sufficient to convert the nitrous oxide to gaseous nitrogen and gaseous oxygen. The amount of catalyst to be utilized in the present process varies depending upon the reaction conditions (i.e., temperature, pressure and the like), and the amount of $N_2O$ residing in the process stream to be treated. Desirably, an effective amount of catalyst is used, i.e., that amount which causes a reaction to occur when $N_2O$ is placed in contact with the enumerated catalysts under the specified reaction conditions. The catalysts of the invention can be fabricated onto high temperature supports known in the art including those customarily used in mobile and stationary emission control applications.

The process of this invention can be utilized to remove $N_2O$ from essentially any gaseous stream containing $N_2O$ and the process is operative even when appreciable amounts of hydrocarbons, $NO_x$, water and oxygen are present in the $N_2O$-containing gaseous mixture. The process according to this invention is typically run at temperatures ranging from about 100° C. to 800° C. and pressures between about 0.1 and 100 atmospheres. However, higher temperatures may be utilized because the maximum temperature for conducting the process is limited only by the temperature stability of the catalyst itself. More particularly, the process can be advantageously run under fixed bed conditions at temperatures ranging from about 100° C. to 800° C. and a gas hourly space velocity ranging from 1,000 to 300,000 $hr^{-1}$, preferably 7,500 $hr^{-1}$ to 30,000 $hr^{-1}$.

Figure 1:
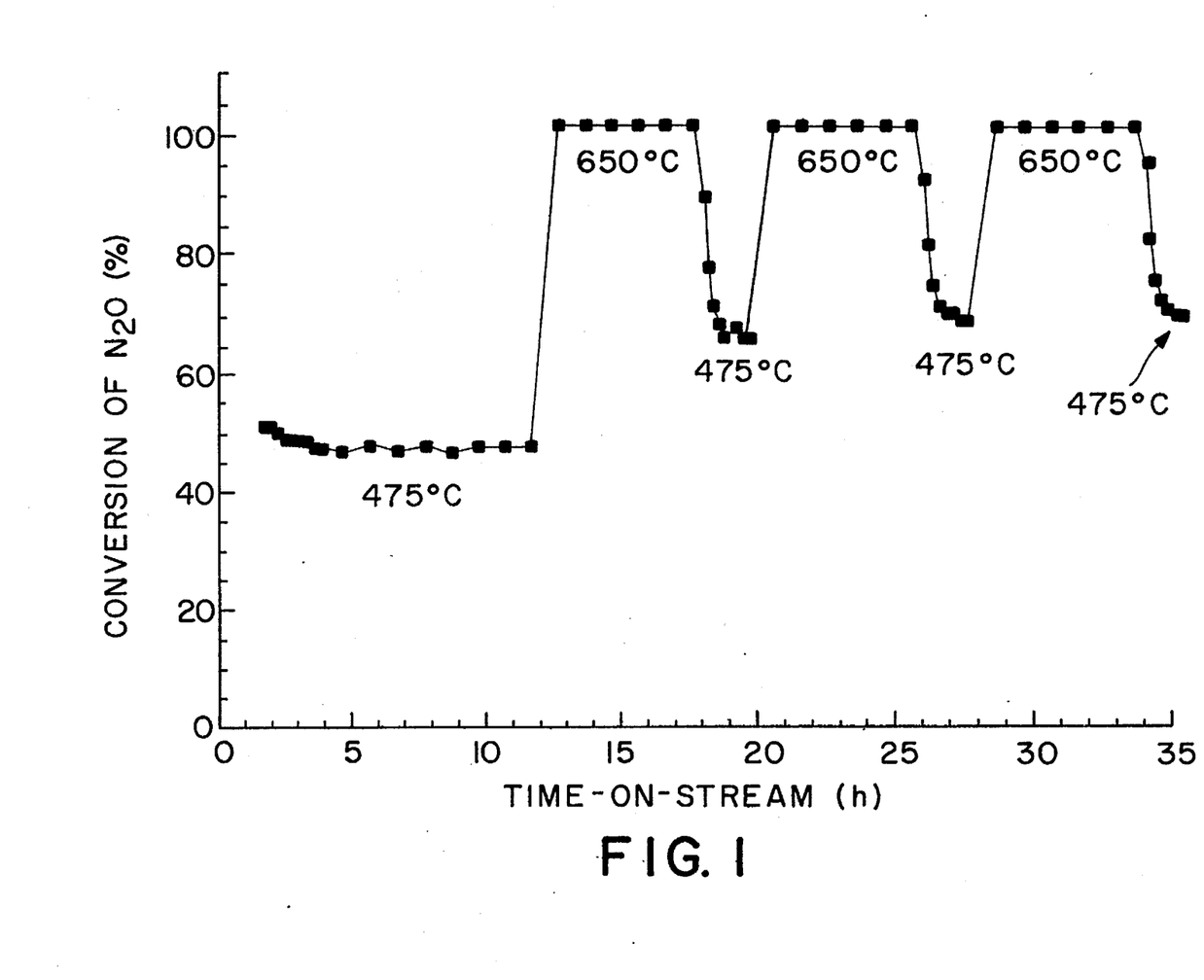
FIG. 1 illustrates conversion of $N_2O$ to gaseous nitrogen and oxygen obtained as a function of time and temperature using an $N_2O$ decomposition catalyst as claimed in '023 application.

FIG. 1 illustrates conversion of $N_2O$ to gaseous nitrogen and oxygen obtained as a function of time and temperature using a cobalt-aluminum hydrotalcite catalyst which was calcined at 500° C. according to the present invention. FIG. 1 indicates that $N_2O$ decomposition activity of the subject catalysts is not markedly affected by exposure to a simulated water-containing $N_2O$ process stream (15% $N_2O$, 2% $H_2O$ and the balance helium) over a 30 hour period. 0.25 g of the catalyst was utilized at a space velocity of 18,000 $hr^{-1}$. FIG. 1 also illustrates that conversion of $N_2O$ to gaseous nitrogen and oxygen approaches 100% at a process temperature of 650° C. and approaches 65% at a process temperature of 475° C. and that such a desired conversion level can be achieved by adjusting the process operating temperature or space velocity.

Figure 2:
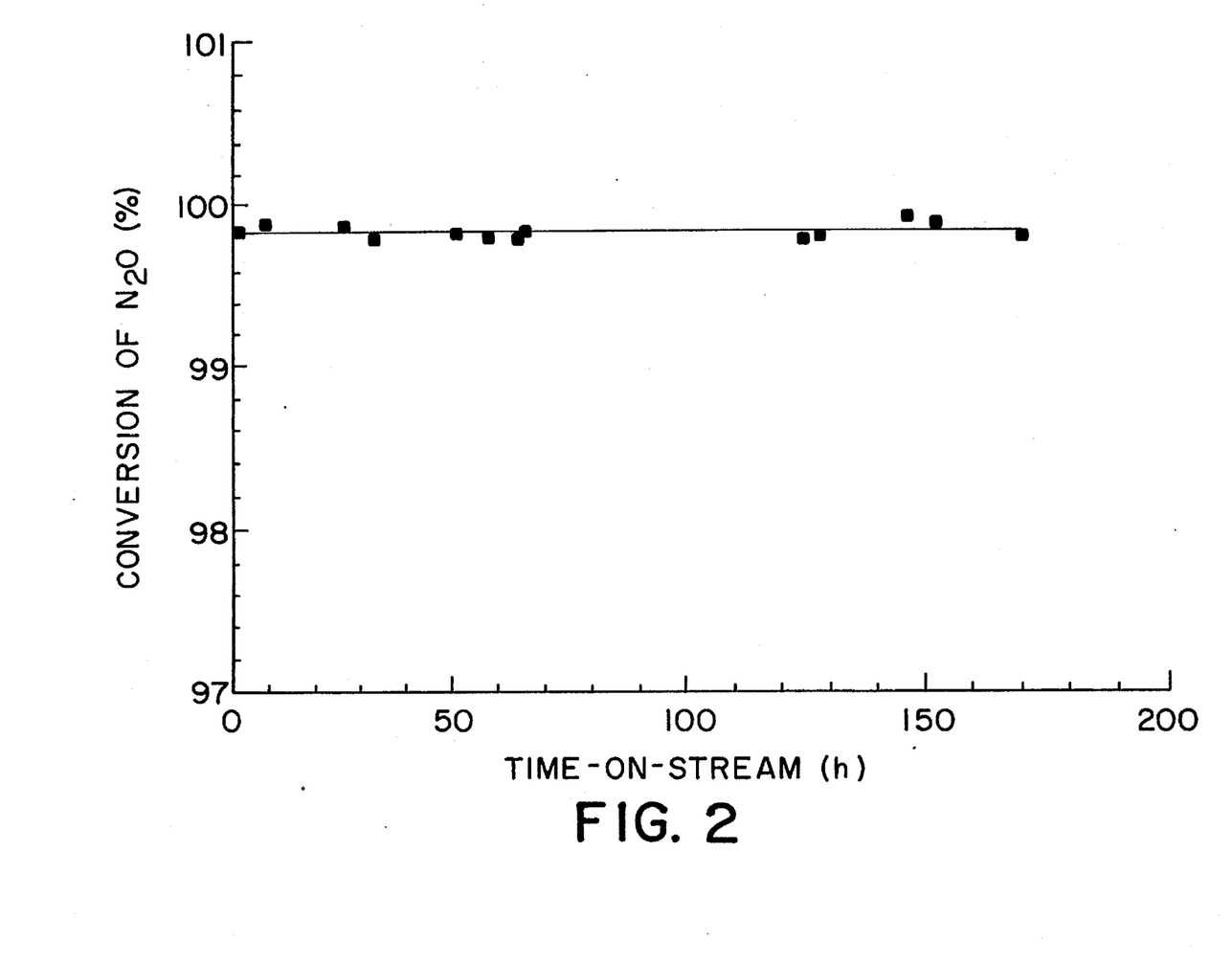
FIG. 2 illustrates conversion of $N_2O$ to gaseous nitrogen and oxygen obtained over extended time periods using an $N_2O$ decomposition catalyst as claimed in '023 application.

FIG. 2 illustrates conversion of $N_2O$ to gaseous nitrogen and oxygen obtained as a function of time using a cobalt-aluminum hydrotalcite catalyst which was calcined at 500° C. A larger bed of catalyst was used in this experiment compared to the experiment according to FIG. 1. While the process temperature was initially maintained at 500° C., the temperature of the catalyst bed increased to about 670° C. due to the exothermic nature of the reaction. FIG. 2 indicates that activity of the subject catalyst was not markedly affected by oxygen or moisture in $N_2O$ containing gaseous mixture over the 175 hour test period. The Process stream contained 10% $N_2O$, 2% $H_2O$, 2% $O_2$ and the balance helium. FIG. 2 illustrates that conversion of $N_2O$ to gaseous nitrogen and oxygen approaches 100% at a process temperature of 670° C.

Figure 3:
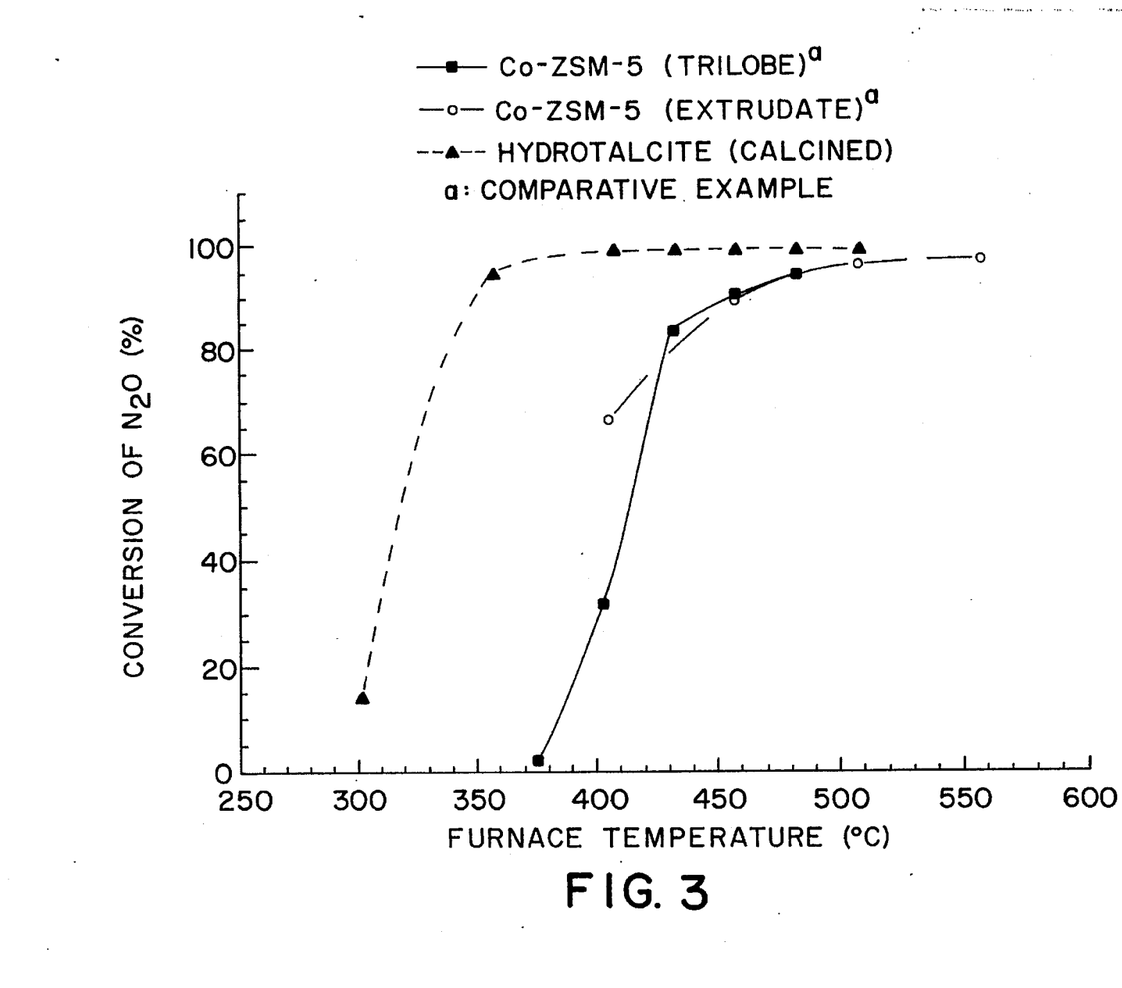
FIG. 3 illustrates conversion of $N_2O$ to gaseous nitrogen and oxygen obtained as a function of time using an $N_2O$ decomposition catalyst as claimed in '023 application versus specified prior art cobalt-containing zeolite catalysts.

FIG. 3 illustrates the light off curves of the calcined cobalt hydrotalcite catalyst of the present invention versus a Co-ZSM-5 catalyst in either trilobe or extrudate form. Experiments were conducted using a feed stream containing 10 $N_2O$, 2% water, 2% oxygen and the balance nitrogen. Reactor pressure was maintained at 10 psig and gas hourly space velocity was maintained between 16,000 and 18,000 $hr^4$. The Co-ZSM-5 catalysts are presented in U.S. Pat. No. 5,171,553, issued Dec. 15, 1992. While the subject hydrotalcite catalyst and Co-ZSM-5 catalyst provide high conversion of $N_2O$ to gaseous nitrogen and oxygen, the calcined hydrotalcite catalyst demonstrates a light off temperature at least 75° C. lower in temperature than Co-ZSM-5. The lower light off temperatures for the catalysts of the present process compared to prior art catalysts represents a significant process advantage in that energy requirements are reduced and less wear and stress are placed upon process equipment.

Figure 4:
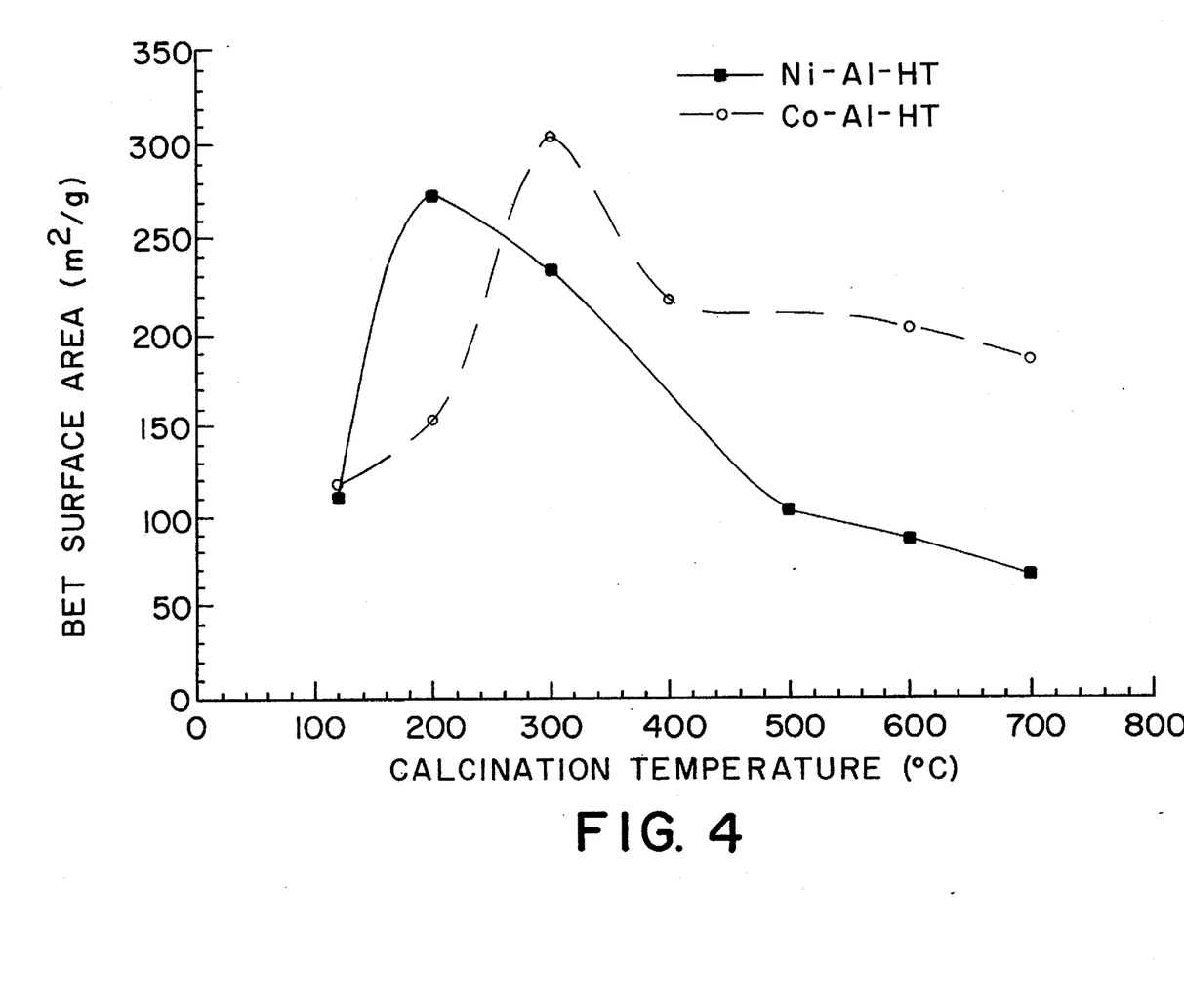
FIG. 4 illustrates the surface area of various calcined anionic clay materials obtained as a function of catalyst calcination temperature.

FIG. 4 demonstrates that surface area of the catalysts according to the present process is substantially affected by heat treatment temperature employed during preparation of such catalysts. The data demonstrate that the optimum heat treatment temperature for achieving maximum surface area varies depending upon catalyst composition. For example, maximum surface area for Ni-Al hydrotalcite is achieved using a heat treatment temperature of about 220° C. while maximum surface area for Co—Al hydrotalcite is achieved using a heat treatment temperature of about 320° C.

The following examples are provided to further illustrate various embodiments of this invention and to provide a comparison between the enumerated catalysts of this invention and prior art catalysts for destroying $N_2O$ residing in gaseous mixtures containing oxygen and/or water. The examples are provided to illustrate the nature of the claimed process and are not intended to limit the scope of the chimed invention. Unless otherwise stated, parts and percentages in the examples are given by volume.

GENERAL EXPERIMENTAL INFORMATION

Inductively coupled plasma emission spectroscopy was used to analyze for $M^{2+}$ and $M^{3+}$ and $Na^+$. X-ray diffraction patterns of the samples were taken using a Philips X-ray generator (Model PW1130) using $CuK_\alpha$ radiation ($\lambda$=1.5418 Å except for Co-containing compound wherein $CoK_\alpha$ radiation ($\lambda$=1.7902 Å) was used. TGA of these compounds were recorded on a Perkin-Elmer TGA7 instrument at temperatures ranging from 50°–900° C. at a heating rate of 20° C/min., under nitrogen atmosphere. The BET surface area of the catalyst powders was measured using a Carlo-Erba (Model 1800) sorptometer at 77° K.

EXAMPLE 1

PREPARATION OF COBALT-ALUMINUM HYDROTALCITE HAVING A Co/Al MOLAR RATIO OF 2.0

A solution of 58.21 g (0.20 mol) cobalt nitrate hexahydrate and 37.5 g (0.10 mol) of aluminum nitrate nonahydrate in 70 cc of distilled water was added dropwise (over a 4-hour period at room temperature) to a solution containing 28.87 g (0.70 mol) 97% NaOH, 20.03 g (0.189 mol) sodium carbonate and 2.2 mol distilled water. The precipitate was stirred for 30 minutes, heated to 65 ° C. for 16 hours, filtered, washed with large amounts of distilled water to remove excess sodium and nitrate, and dried at 110° C. 54.7% Co by weight, 11.2% Al by weight, Co/Al (atom)=2.23, d(003)= 7.58 Å.

XRD and IR confirmed that the compound prepared is single phase in nature with hydrotalcite-like structure. XRD showed sharp and symmetric reflections for (003), (006) and (110) planes indicating crystallinity characteristic of clay minerals possessing a layered structure. TGA studies showed two stages of weight losses. The first weight loss occurring between 150° and 200° C. and the second occurring between 225° and 275° C. This result, was substantiated by differential scanning calorimetry results which showed two endothermic peaks corresponding to the two weight losses.

EXAMPLE 2

PREPARATION OF NICKEL-ALUMINUM HYDROTALCITE HAVING A Ni/Al MOLAR RATIO OF 2

A solution of 58.16 g nickel nitrate hexahydrate and 34.51 g of aluminum nitrate nonahydrate in 140 cc of distilled water was added dropwise (over a 4-hour period at room temperature) to 228 cc solution of 28.87 g 97% NaOH and 20.03 g sodium carbonate while maintaining the temperature at or below room temperature. The precipitate was stirred for 30 minutes, heated to 65° C. for 16 hours, filtered, washed with large amounts of distilled water to remove excess sodium and nitrate, and dried at 110° C. 56.1% Ni by weight, 13.1% Al by weight, Ni/Al(atom)=1.97; d(003)=7.55

EXAMPLE 3

PREPARATION OF COPPER-ALUMINUM HYDROTALCITE HAVING A Cu/Al MOLAR RATIO OF 2.0

A solution of 23.26 g cupric nitrate pentahydrate and 18.76 g of aluminum nitrate nonahydrate in 140 cc of distilled water was added dropwise (over a 3-hour period at room temperature) to a 114 cc solution of 14.44 g 97 % NaOH and 10.02 g sodium carbonate while maintaining the temperature at or below room temperature. The precipitate was stirred for 60 minutes, heated to 65° C. for 18 hours, filtered, washed with large amounts of distilled water to remove excess sodium and nitrate, and dried at 110° C. 66.0% Cu by weight, 12.6% Al by weight, Cu/Al=2.22.

EXAMPLE 4

PREPARATION OF COBALT,MAGNESIUM - ALUMINUM HYDROTALCITE HAVING A Co/Mg/Al MOLAR RATIO OF 2/1/1

A solution containing $Co^{2+}$, $Mg^{2+}$ and $Al^{3+}$ was made by dissolving 29.1 g $Co(NO_3)_2.6H_2O$ (0.1 tool), 12.8 g $Mg(NO_3)_2.6H_2O$ (0.05 $Al(NO_3)_3.9H_2O$ (0.05 mol) in 75 ml of deionized water at room temperature. A second solution was made by dissolving 14 g NaOH (0.35 mol) and 10.6 g $Na_2CO_3$ (0.1 mol) in 100 ml of deionized water at room temperature. The second solution was slowly added (drop-by-drop) to the first solution at room temperature in a period of 1 hour with a vigorous stirring. The final pH of the precipitate suspension was 10. The precipitates were aged at 65 ° C. for 18 hours with a good mixing. The resulting product was then filtered, washed with 300 ml of water in a beaker and filtered again. Finally, the material was dried in an oven at 110° C. in air overnight. The yield was 18.0 g. The anionic clay material prepared according to this method corresponds to the formula of the preferred embodiment wherein M is a mixture of cobalt and magnesium. Elemental analyses of this sample show 30.7% Co by weight, 6.05% Mg by weight and 7.12% Al by weight. The molar ratio of Co/Al=1.97 and Mg/Al=0.94. The d(003) spacings were found to be 7.69 Å by X-ray diffraction.

EXAMPLE 5

PREPARATION OF COBALT-RHODIUM, ALUMINUM HYDROTALCITE HAVING A Co/Rh/Al MOLAR RATIO OF 2/0.2/1

A solution of 1.0 g (10% Rh) rhodium nitrate, 28.81 g cobalt nitrate hexahydrate and 18.76 g of aluminum nitrate nonahydrate in 114 cc of distilled water was added dropwise (over a half-hour period at room temperature) to a 114 cc solution of 14.44 g 97% NaOH and 10.02 g sodium carbonate while maintaining the temperature at or below room temperature. The precipitate was stirred for 2 hours, heated to 65° C. for 18 hours, filtered, washed with large amounts of distilled water to remove excess sodium and nitrate, and dried at 110° C. The anionic clay material prepared according to this method corresponds to the formula of the preferred embodiment wherein M is cobalt and a portion of the aluminum has been replaced by rhodium. 58.3% Co by weight, 11.9% Al by weight, Co/Al=2.24, Rh/Al=0.016; d(003)=7.54 Å.

EXAMPLE 6 cl CATALYTIC DECOMPOSITION OF $N_2O$ OVER CALCINED ANIONIC CLAY CATALYSTS

The following general procedure was utilized for catalytically converting $N_2O$ to gaseous nitrogen and gaseous oxygen over the catalysts of the present invention. The reactor was a Quartz, "U" tube having an inlet of ¼" O.D. and an outlet of ⅜" O.D., wherein the catalyst was located at the outlet section. Typical catalyst weight used in these tests was 0.1 gram. The GHSV was 30,000 $h^{-1}$. The reactor was surrounded by a temperature-controlled furnace and the temperature was monitored by a J-type thermocouple which was in contact with the catalyst bed. The concentration of $N_2O$ was 985 ppm balanced by He. Oxygen (2.5%) was added for some runs. $H_2O$ (2%) was added to the feed via a $H_2O$ saturator, and the level of $H_2O$ added can be controlled by adjusting the temperature of this saturator.

The activity measurements were made using a microcatalytic reactor in a steady-state flow mode. Product analysis was obtained using an on-line gas chromatograph with a thermal conductivity detector. The separation column was packed Porapak Q (80/100 mesh) and was 4 feet long having a ⅛" outer diameter. Chromatograph oven temperature was 25° C. and the flow rate of the carder gas was 30 $cm^3$/min.

$N_2O$ decomposition experiments were carried out at ambient pressure and 0.1 g of catalyst in a plug-flow reactor was used for each run. The flow rate of the feed was 100 cma/min and remained constant resulting in a gas hourly space velocity (GHSV) of 30,000 $h^4$. The reaction temperatures studied ranged from 200° to about 800° C. The catalysts studied were dried for one hour at 500° C. over a helium stream prior to use.

PRESENTATION OF DATA

The catalysts according to Examples 1 through 5 and various prior art catalysts were tested according to the procedure of Example 6 for catalytic decomposition of $N_2O$ in the presence of oxygen. Reaction conditions were maintained constant using a feedstream of 0.1% $N_2O$ and 99.9 % helium. An $N_2O$-containing gaseous mixture containing 2.5 % oxygen and 2 % $H_2O$ was used as a feedstream in order to determine the effect of oxygen and water on catalyst activity.

The results presented in Table 1 compare reaction conversion of $N_2O$ to gaseous nitrogen and oxygen obtained using calcined cobalt-aluminum hydrotalcite catalysts having varied ratios of cobalt and aluminum cation as a function of temperature. Runs 1 through 5, prepared according to the method of Example 1, present materials having a Co/Al ratio ranging from 1.1 to 3.55 which were used to decompose $N_2O$ residing in a helium stream containing 985 ppm $N_2O$ and alternately, 2.5 % oxygen or 2.5 % oxygen and 2 % water vapor. The results demonstrate that $N_2O$ conversion for each of the runs increases with increasing reaction temperature with the best results obtained according to Run 4 which exhibits 84 % $N_2O$ conversion at a reaction temperature of 450° C. Runs 3 through demonstrate that the presence of oxygen or oxygen and water vapor in the $N_2O$-containing gaseous mixture diminishes $N_2O$ conversion.

TABLE 1

Effect of Co/Al Ratio on $N_2O$ Decomposition Using a Cobalt-Aluminum Hydrotalcite Catalyst Calcined at 500° C.[a]

| Run | Catalyst Co/Al Ratio | BET Area ($m^2/g$) | $N_2O$ Conversion (%) | | | | |
|---|---|---|---|---|---|---|---|
| | | | 300° C. | 350° C. | 400° C. | 450° C. | 500° C. |
| 1 | 1.1 | 164 | 8 | 12 | 22 | 45 | 79 |
| 2 | 2.0 | | 9 | 17 | 36 | 68 | 93 |
| 3 | 2.55 | | 16 | 27 | 49 | 81(61[b],17[c]) | N/A |
| 4 | 3.0 | 100 | 13 | 24 | 53 | 84(67[b],25[c]) | N/A |
| 5 | 3.55 | | 10 | 18 | 49 | 82(61[b],14[c]) | N/A |

[a]Test conditions: 985 ppm $N_2O$ in He; 0.1 g sample; F = 100 cc/min.
[b]with 2.5% oxygen
[c]with 2% water and 2.5% oxygen Table 2 illustrates the effect of calcination temperature on catalyst activity for $N_2O$ decomposition using a cobalt aluminum hydrotalcite catalyst having a Co/Al ratio of 2.2. Runs 6 through 8, prepared according to the method of Example 1, were used to decompose $N_2O$ residing in a helium stream containing 985 ppm $N_2O$ and alternately, 2.5% oxygen or 2.5% oxygen and 2% water vapor. The results demonstrate that $N_2O$ conversion is maximized when the subject catalyst is calcined (heat treated) at a temperature ranging from 400° to 500° C. Runs 6 and 7 demonstrate that the presence of oxygen or oxygen and water vapor in the $N_2O$-containing gaseous mixture diminishes $N_2O$ conversion.

TABLE 2

Effect of Calcination Temperature on Catalyst Activity for $N_2O$ Decomposition Using a Cobalt-Aluminum-Hydrotalcite Catalyst (Co/Al = 2.2)[a]

| Run | BET Area ($m^2/g$) | Calcination Temp (°C.) | $N_2O$ Conversion (%) | | | | |
|---|---|---|---|---|---|---|---|
| | | | 300° C. | 350° C. | 400° C. | 450° C. | 500° C. |
| 6 | 50 | 400 | 45 | 79 | 94 | 99(97[b],43[c]) | N/A |
| 7 | | 500 | 47 | 74 | 93 | 99(96[b],54[c]) | N/A |
| 8 | 10 | 800 | 5 | 5 | 9 | 12 | 27 |

[a]Test conditions: 985 ppm $N_2O$ in He; 0.1 g sample; F = 100 cc/min.
[b]with 2.5% oxygen
[c]with 2% water and 2.5% oxygen The results presented in Table 3 compare reaction conversion of $N_2O$ to gaseous nitrogen and oxygen obtained using calcined anionic clay materials containing copper (Run 9), nickel (Run 10), rhodium (Runs 16 and 17) and cobalt, palladium (Run 12) versus conversion obtained using Co-ZSM-5 (Run 13), disclosed in U.S. Pat. No. 5,171,553. The results demonstrate that the claimed process provides excellent conversion of $N_2O$ to gaseous nitrogen and oxygen. In particular, Run 17, a cobalt-rhodium aluminum hydrotalcite, prepared according to Example 5, provides 100% conversion of $N_2O$ to gaseous nitrogen and oxygen at a process temperature of 300° C, a full 150° lower than the 450° C. temperature required for Co-ZSM-5 (Run 11) to yield comparable conversion. Moreover, Ni-Al-hydrotalcite (Run 10) provides substantially the same conversion to $N_2O$ at a process temperature of 450° C when in the absence or presence of oxygen and water. When $Al^{3+}$ is partially replaced by $La^{3+}$(Al/La=1) (Run 19), the resulting material, Co-Al, La-HT, shows significantly high activity at low temperature (79% at 300° C.).

TABLE 3

Catalyst Activity for Various Compositions in $N_2O$ Decomposition[a]

| Run | Catalyst | Catalyst Composition | BET Area $m^2/g$ | Calcine Temp (°C.) | $N_2O$ Conversion (%) 300° C. | 350° C. | 400° C. | 450° C. | 500° C. |
|---|---|---|---|---|---|---|---|---|---|
| 9  | Cu—Al—HT     | Cu/Al = 2.0                    | —   | 550 | 10  | 12  | 24  | 48                 | 81  |
| 10 | Ni—Al—HT     | Ni/Al = 3.0                    | 149 | 500 | 12  | 25  | 66  | 95(92[b],99[c])    | N/A |
| 11 | Co—ZSM-5     | Co/Al = 0.53                   |     |     | 8   | 18  | 59  | 92(92[b],25[c])    | N/A |
| 12 | Co, Pd—Al—HT | Co/Al = 2.19<br>Pd/Al = 0.045  | 102 | 500 | 11  | 27  | 59  | 90                 | N/A |
| 13 | Co—Al—HT     | Co/Al = 3.0                    | 100 | 500 | 13  | 24  | 53  | 84(67[b],25[c])    | N/A |
| 14 | Co, Mg—Al—HT | Co/Mg/Al = 2/.94/1             | 93  | 500 | 36  | 66  | 94  | 100(97[b],79[c])   | N/A |
| 15 | Mg—Al—HT     | Mg/Al = 2.2                    |     | 500 | 1   | 1   | 1   | 1                  | 2   |
| 16 | Co—Rh, Al—HT | 0.3 wt % Rh                    |     | 500 | 56  | 72  | 98  | 100(99[b],88[c])   | N/A |
| 17 | Co—Rh, Al—HT | 0.7 wt % Rh                    | 119 | 500 | 100(—[b],7[c]) | N/A | 100(—[b],67[c]) | 100(100[b], 100[c]) | N/A |
| 18 | Co—Ru, Al—HT | 1.0 wt % Ru                    |     | 500 | 9   | 16  | 38  | 71(42[b],12[c])    | N/A |
| 19 | Co—La, Al—HT | Co/La/Al = 4/1/1               |     | 500 | 79  | 92  | 98  | 100                | 100 |
| 20 | Co, Zn—Al—HT | Co/Zn/Al = 1.5/1.5/1           |     | 500 | 13  | 27  | 44  | 70                 | 92  |

[a]Test conditions: 985 ppm $N_2O$ in He; 0.1 g sample; F = 100 cc/min.
[b]with 2.5% oxygen
[c]with 2% water and 2.5% oxygen The enumerated catalysts of the present invention provide several improvements over prior art processes for removing $N_2O$ from combustion processes. First, the claimed catalysts are unexpectedly more active at lower process operating temperatures than prior art catalysts in converting $N_2O$ to nitrogen gas and oxygen gas. Second, the catalysts are not significantly deactivated in the presence of oxygen or water in the process feedstream.

EXAMPLE 7

EFFECT OF ALKALI AND ALKALINE-EARTH METALS

Co—Al hydrotalcite catalysts were prepared in accordance with the method set forth in Example 1, with varying ratios of Co:Al. The catalysts were tested for $N_2O$ decomposition activity in gas streams containing water, using the method set forth in Example 6. Activity in dry feeds was found to vary with the ratio of Co:Al. Preferably, the ratio of Co:Al is in the range of about 0.5:1 to about 6:1, more preferably about 1:1 to about 4:1, with good results obtained with a ratio in the range of about 2:1 to about 3:1, and with particularly good results obtained using a Co:Al ratio of about 2.2:1. This same relation was found to hold true in wet feed streams where 2% $H_2O$ had been added. These catalysts were prepared in relatively small quantities of 15 to 20 grams.

In scaling Co-hydrotalcite from 20 to 200 grams, at Co/Al=2.2, it was unexpectedly found that $N_2O$ catalytic activity was greatly reduced in wet gas streams, as shown by the data presented in Table 4. In particular, the first two intermediate scale up preparations of 90 g (Samples 22 and 23) shared comparable activity at 475° C. with the 20 g preparation (Sample 21). On the other hand, the 200 g sample (Sample 24) was relatively inactive. In analyzing these samples, it was found that sample 24 had a sodium content of about 15.4 wt. %, while the sodium content of the better performing Samples 21–23 was about 3 to 6 wt. %. As discussed in Examples 1 to 5 above, all of the catalysts prepared for use in treating $N_2O$ contained a certain amount of residual sodium, and the preparation steps always included at least some washing with distilled water to remove "excess sodium", among other things. In the belief that additional washing was required to bring the sodium content down, Sample 24 was exhaustively washed, reducing the sodium content to 0.16 % (Sample 25). This sample also showed poor $N_2O$ conversion. A 90 g sample was also washed exhaustively, reducing the sodium content to 0.06 % (Sample 26), and this sample showed even poorer $N_2O$ conversion.

TABLE 4

| | $N_2O$ Decomposition Activity | | |
|---|---|---|---|
| Sample # | Scale | % $N_2O$ Decomposition | Wt. % Na |
| 21 | 20  | 88 | 5.4  |
| 22 | 90  | 94 | 3.4  |
| 23 | 90  | 81 | 4.7  |
| 24 | 200 | 22 | 15.4 |
| 25 | 200 | 34 | 0.16 |
| 26 | 90  | 12 | 0.06 |

In each case, 3.5 g of catalyst were tested using the method set forth in Example 6, modified for testing a larger sample (3.5 g versus 0.1 g), using a wet gas stream of 15% $N_2O$, 2% $H_2O$, balance He, at 475° C. and GHSV =18,000 $h^{-1}$, with percentages of gas stream components all being by volume. The reactor was a one-inch stainless steel straight tube upflow reactor. The catalysts were first calcined in air at 500° C. for 4 hours. It should be noted that the percentage of sodium was measured prior to calcination. From the data presented in Table 4, it can be seen that those catalysts having a sodium content between 3 and 6 weight percent exhibited good $N_2O$ decomposition activity levels of over 80%. On the other hand, catalysts with very high or very low sodium contents exhibited poor $N_2O$ decomposition values of less than 50%.

Using the washed Sample 25, sodium was added to the uncalcined catalysts by incipient wetness at concentrations of 1 to 10 wt. % to re-instill $N_2O$ decomposition activity. A washed sample containing 0.135 wt. % sodium was compared with samples reconstituted with sodium to concentrations of 1.0%, 2.0%, 5.0% and 10.0%. In each case, $N_2O$ decomposition activity was tested by the method described above, using 3.5 g samples, a gas stream of 15% $N_2O$, 2% $H_2O$, balance He, at 475° C. and GHSV=18,000 $h^{-1}$, and with the catalysts air calcined at 500° C. The results are depicted graphically in FIG. 5, which shows % $N_2O$ conversion versus time in minutes. The results indicate best results at sodium concentrations of 1 to 2 wt. %, with decreasing activity at sodium concentrations of 5 wt. % and 10 wt. %. The washed sample with 0.135 wt. % sodium showed the poorest results.

Figure 5:
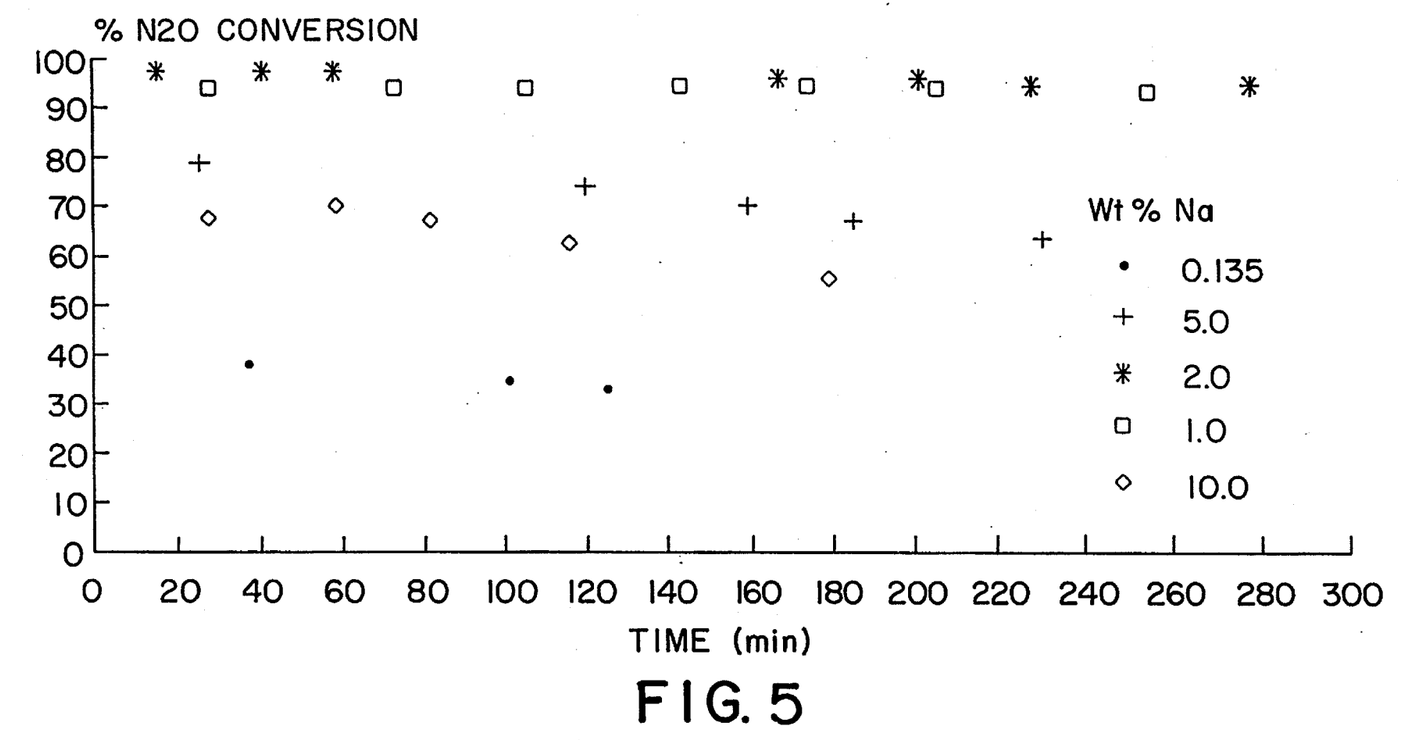
FIG. 5 illustrates the effect of sodium content over time on $N_2O$ decomposition by Co—Al hydrotalcite.

Comparing the results presented in Table 4 to those presented in FIG. 5, it seems that all sodium is not equally accessible to promoting $N_2O$ decomposition. In samples in which the naturally occurring sodium is present, levels of about 3 to 6 wt. % Na give best results, while in samples which have been thoroughly washed and reconstituted with sodium, levels of about 1 to 2 wt. % Na seem to give best results. It is believed that returning sodium to thoroughly washed catalysts places the sodium at the most effective sites for promoting catalytic activity, so that a smaller total sodium content is needed.

Other alkali metals and magnesium were also found to promote $N_2O$ decomposition over Co—Al hydrotalcite. When added to the washed Sample 25 at a concentration of 2.3 mmol metal/gram catalyst (comparable to about 5 wt. % Na), a potassium doped catalyst showed the same effect as sodium, as shown in Table 5. Lithium and magnesium were less effective as promoters for $N_2O$ decomposition than either sodium or potassium as the concentrations tested. However, no attempt was made to determine optimal concentration levels for these promoters. At this concentration of metal, calcium was not found to be effective. Again, the test conditions were as described above.

TABLE 5

| | $N_2O$ Decomposition Activity | |
|---|---|---|
| Sample # | Metal | % $N_2O$ Decomposition |
| 27 | Na | 76 |
| 28 | K | 77 |
| 29 | Li | 64 |
| 30 | Mg | 64 |
| 31 | Ca | 6 |

EXAMPLE 8

EFFECT OF CALCINATION

Figure 6:
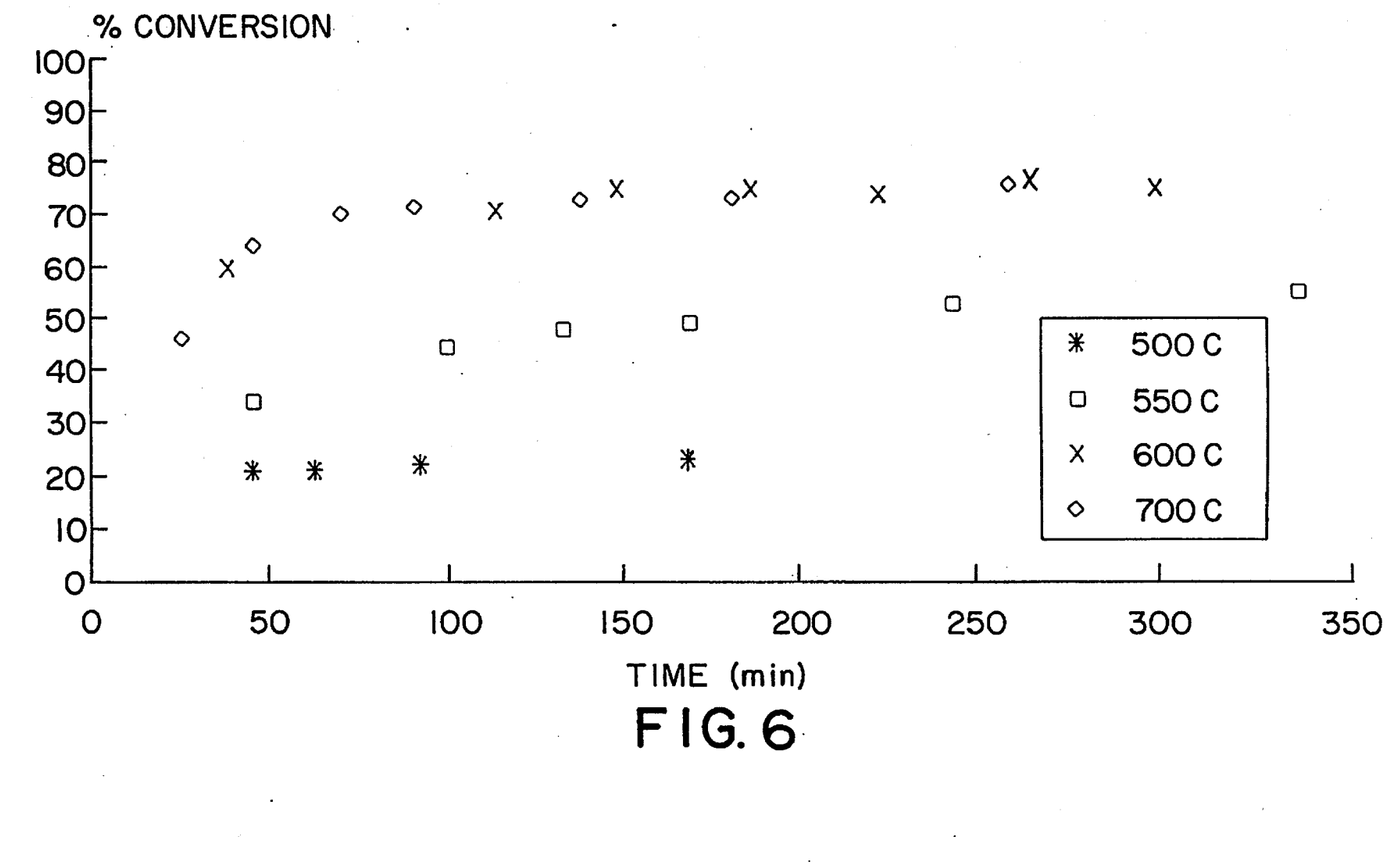
FIG. 6 illustrates the effect of calcination temperature over time on $N_2O$ decomposition by Co—Al hydrotalcite with high residual sodium.

As discussed above, all of the samples tested in Example 7 were calcined in air at 500° C. for 4 hours. As shown by the results for Sample 24 in Table 4, the catalyst which contained 15.4 wt. % residual Na in its uncalcined form yielded poor results in the $N_2O$ conversion test. Tests were conducted to determine the effect of calcining at higher temperatures to overcome the negative impact of high sodium content in Co—Al hydrotalcite. Tests were conducted as in Example 7, using 3.5 g of catalyst, with a gas stream of 15 % $N_2O$, 2–3% $H_2O$, balance He, at 475° C. and GHSV =18,000 $h^4$. The results set forth in Table 6 show the effect of calcination on residual Na present after calcination, and the effect on $N_2O$ decomposition. Sample 32 is the same material as Sample 24, in Example 7 above, but the sodium content was measured after calcination. Samples 33–35 were calcined at 550°, 600° and 700° C., respectively. Sample 36 is the same as the thoroughly washed Sample 25 in Example 7 above, with Sample 37 being the same sample calcined at 600° C. The results of these tests are also shown in FIG. 6, which depicts the % $N_2O$ conversion versus time, in minutes, for the high sodium content Samples 32–35.

TABLE 6

| | Effect of Calcination Temperature | | |
|---|---|---|---|
| Sample # | Calc. Temp. (°C.) | Wt. % Na | % $N_2O$ Decomposition |
| 32 | 500 | 10.5 | 22 |
| 33 | 550 | 7.8 | 51 |
| 34 | 600 | 7.7 | 75 |
| 35 | 700 | — | 75 |
| 36 | 500 | 0.16 | 32 |
| 37 | 600 | — | 14 |

As seen in Table 6, raising the calcination temperature to 600° C. boosts the activity about 50 points, but there is no further change in activity when the calcination temperature is raised to 700° C. In a thoroughly washed sample with very low sodium content, calcination at 600° C. actually impeded $N_2O$ conversion. It was surprising to find that calcination reduced sodium content even though the sodium oxide species are generally not volatile at these temperatures. However, the calcination crucibles showed signs of devitrification, and this may account for at least some of the sodium loss. Devitrification was not observed when calcining the hydrotalcite samples with low sodium content. Having thus described the present invention, what is now deemed appropriate for Letters Patent is set forth in the following Claims.

We claim:

1. An improved process for removing $N_2O$ from an $N_2O$-containing gaseous mixture in which the process includes heat treating a catalyst precursor to form a catalyst and reacting the $N_2O$-containing gaseous mixture in the presence of said catalyst under conditions sufficient to convert the $N_2O$ to gaseous nitrogen and gaseous oxygen, wherein the catalyst precursor comprises an anionic clay material represented by the formula $M_m N_n (OH)_{(2m+2n)} A_a \cdot bH_2O$ wherein M is a divalent metal cation;

N is a trivalent metal cation;

A is a mono-, di- or trivalent anion which decomposes when heated to a temperature sufficient to form a volatile gas;

m and n are such that m/n has values of 0.5 to about 6;

a is a number with the provisos that when A is a monovalent anion, a=n, when A is a divalent anion, a=½ n and when A is a trivalent anion a=⅓ n; and b is an integer having values of 1 to 10, which anionic clay material is heated to the temperature sufficient to cause A, the mono-, di- or trivalent anion, to decompose to form the volatile gas, and wherein the improvement comprises providing the catalyst precursor with a minimum of about 1 percent by weight of an activator metal separate from M, selected from the group consisting of sodium, potassium, lithium, magnesium and mixtures thereof.

2. The process of claim 1 wherein the activator metal is present in an amount of about 1 to about 10 percent by weight.

3. The process of claim 2 wherein the activator metal is present in an amount of about 1 to about 6 percent by weight.

4. The process of claim 3 wherein the activator metal comprises residual activator metal present in the catalyst precursor.

5. The process of claim 4 wherein the activator metal is present in the catalyst precursor in an amount of about 3 to about 6 percent by weight.

6. The process of claim 5 wherein the activator metal is sodium.

7. The process of claim 1 wherein the catalyst precursor is washed to remove essentially all of the activator metal initially present therein, and then activator metal is added to the catalyst precursor.

8. The process of claim 7 wherein about 2.3 mmol of activator metal per gram of catalyst precursor is added to the washed catalyst precursor.

9. The process of claim 7 wherein about 1 to about 2 weight percent activator metal is added to the washed catalyst precursor.

10. The process of claim 9 wherein the activator metal is sodium.

11. The process of claim 1 wherein the catalyst precursor is a hydrotalcite.

12. The process of claim 11 wherein the catalyst precursor is a cobalt-aluminum hydrotalcite.

13. The process of claim 12 wherein the ratio of cobalt to aluminum is about 0.5:1 to about 6:1.

14. The process of claim 13 wherein the ratio of cobalt to aluminum is about 1:1 to about 4:1.

15. The process of claim 14 wherein the ratio of cobalt to aluminum is about 2:1 to about 3:1.

16. The process of claim 1 wherein the activator metal is sodium and the catalyst precursor is a cobalt-aluminum hydrotalcite.

17. The process of claim 1 wherein the catalyst precursor is heated to a temperature of about 200° to about 800° C. to form the catalyst.

18. The process of claim 17 wherein the catalyst precursor is heated to a temperature of at least about 500° C. to form the catalyst.

19. The process of claim 18 wherein the catalyst precursor is heated to a temperature of at least about 600° C. to form the catalyst.

20. The process of claim 1 wherein the $N_2O$-containing gaseous mixture comprises at least about 0.5 volume percent water.

21. The process of claim 20 wherein the $N_2O$-containing gaseous mixture comprises at least about 2 volume percent water.

* * * * *